United States Patent Office

Re. 28,242
Reissued Nov. 12, 1974

28,242

METHOD FOR MANUFACTURING TETRONIC ACID

Karl-Josef Boosen, La Neuveville, Switzerland, assignor to Lonza Ltd., Gampel, Valais, Switzerland No Drawing. Original No. 3,758,515, dated Sept. 11, 1973, Ser. No. 40,699, May 26, 1970. Application for reissue Feb. 7, 1974, Ser. No. 441,028
Claims priority, application Switzerland, May 28, 1969, 8,076/69
Int. Cl. C07d *5/06*
U.S. Cl. 260—343.6 8 Claims

Matter enclosed in heavy brackets [ ] appears in the original patent but forms no part of this reissue specification; matter printed in italics indicates the additions made by reissue.

ABSTRACT OF THE DISCLOSURE

Process for the preparation of tetronic acid in an alkyl ester of gamma-chloro-acetoacetic acid is reacted with an aryl amine to form a beta-arylamnio crotonic acid lactone. This is reacted with an alkali metal hydroxide to form a salt of tetronic acid from which tetronic acid is obtained by acidification.

BACKGROUND OF INVENTION

Tetronic acid is a known compound which is utilized, amongst other purposes, as an accelerating agent for photographic development. It has been prepared by catalytic hydration of alpha-bromtetronic acid which, in turn, is prepared from alpha, gamma dibromoacetoacetic esters by heating in vacuum. In this latter reaction an alkyl bromide splits out from the dibromo compound. The process, however, is not satisfactory since it starts from the dibromo compound which has to be prepared from the acetoacetic ester (U.S. Pat. 3,305,363).

It is also known according to Russian Pat. 164,298 to manufature tetronic acid by reaction of a gamma-bromoacetoacetic ester with alkali. In this method the product isolated in all cases is a derivative of tetronic acid. Moreover, the yied in the most favorable case is only about 40%.

A process has now been discovered for the preparation of tetronic acid in high yield.

The invention

In accordance with this invention tetronic acid is prepared by a series of steps in which:

(1) an alkyl ester of gamma-chloro-acetoacetic acid is reacted with an aromatic amine in a reaction inert aromatic hydrocarbon preferably at a temperature of from about 70° C. to 140° C. to form the corresponding beta-arylamino crotonic acid lactone,
(2) separating said lactone,
(3) reacting said lactone with an alkali metal hydroxide to form the alkai metal salt of tetronic acid, and
(4) converting said salt to tetronic acid by reaction with a mineral acid such as hydrochloric, sulfuric, and the like.

The desired product is most conveniently isolated by vacuum sublimation at pressures up to about 0.5 torr at a temperature of from about 95° C. to 100° C.

The initial reaction preferably takes place in the presence of catalytic quantities of a lower alkanoic acid such as glacial acetic acid. From about 1% to 2% by weight of acid based on the weight of reaction inert solvent have been found to be effective.

Suitable reaction inert solvents include aromatic hydrocarbons such as benzene, toluene, and the xylenes boiling from about 70° C. to 140° C. at atmospheric pressure. Benzene is preferred because of its low boiling point.

A wide variety of esters of gamma-chloro-acetoacetic acid can be employed in the initial reaction. Esters of lower alkanols such as methanol, ethanol and propanol are preferred because of their ready availability.

Substituted and unsubstituted aromatic amines, especially aryl amines including phenyl amines such as aniline, chloranilines and toluidines can be used to prepare the novel intermediate lactones. Aniline is preferred because of its ready availability. The lactone separates from the reaction inert aromatic hydrocarbon and is reacted with an alkali metal hydroxide, suitably an aqueous hydroxide prepared from potassium or sodium hydroxide. The amine which separates during the reaction may be recycled for the preparation of additional quantities of tetronic acid.

The following non-limiting example is given by way of illustration only.

Example

A total of 164.5 g. of the ethyl ester of gamma-chloroacetoacetic acid, 93 g. of aniline, 180 ml. of benzene and 3 ml. of glacial acetic acid are refluxed for 3 hours in a one liter four necked flask equipped with a stirrer, reflux condenser, thermometer and water trap. During this period 18 ml. of water and 64 g. of ethyl chloride were split off. After cooling, 152 g. of beta-amino-crotonic-acid lactone crystallized from solution (87% of theoretical yield). It was recovered, washed with benzene and dried.

A total of 17.5 g. of the recovered product was dissolved in 150 ml. of alcohol, the solution mixed with 100 ml. of 20% aqueous sodium hydroxide and stirred for 12 hours at 35° C. to 40° C. The clear solution containing the sodium salt of tetronic acid was acidified with 120 ml. of 18% hydrochloric acid and the solvent removed by evaporation to leave a dry residue. The residue was sublimated at a pressure of 0.5 torr at a bath temperature of 95° C. to 100° C. to provide 6 g. of pure tetronic acid (60% of theoretical yield based on starting lactone).

The product was identified by elemental analysis, infra-red spectra and its solidification point of 140° C. to 141° C.

What is claimed is:

1. A process for the preparation of tetronic acid which comprises the steps of:
(a) reacting a lower alkyl ester of gamma-chloroacetoacetic acid with an aryl amine, selected from the group consisting of aniline, chloroaniline and toluidine in a reaction inert aromatic hydrocarbon at a temperature of from about 70° C. to 140° C. to form the corresponding beta-arylamino crotonic acid lactone,
(b) separating said lactone from said aromatic hydrocarbon,
(c) reacting said lactone with an alkali metal hydroxide to form the alkali metal salt of tetronic acid and
(d) converting said salt to tetronic acid by reaction with mineral acid.

2. A process as in claim 1 wherein the acid is isolated by sublimation in vacuum at a pressure up to about 0.5 torr and a temperature of from about 95° C. to 100° C.

3. A process as in claim 1 in which the reaction between the ester of gamma-chloro-acetoacetic ester and the aromatic amine is effected in the presence of catalytic quantities of glacial acetic acid.

4. A process as in claim 1 wherein the aromatic hydrocarbon is benzene.

5. A process as in claim 1 wherein the amine is aniline.

6. Beta-anilino-crotonic acid lactone.

7. A process for the preparation of tetronic acid which comprises the steps of:

(a) reacting an alkyl ester of gamma-chloro-aceto-acetic acid with an aryl amine selected from the group consisting of aniline, chloroaniline and toluidine in a reaction inert aromatic hydrocarbon to form the corresponding beta-arylamino crotonic acid lactone, (b) separating said lactone from said aromatic hydrocarbon, (c) reacting said lactone with an alkali metal hydroxide to form the alkali metal salt of tetronic acid and (d) converting said salt to tetronic acid by reaction with mineral acid.

8. A process as in claim 7 wherein the acid is isolated by sublimation in vacuum at a pressure up to about 0.5 torr and a temperature of from about 95° C. to 100° C.

References Cited

The following references, cited by the Examiner, are of record in the patented file of this patent or the original patent.

UNITED STATES PATENTS 2,605,268 7/1952 Schuster ---------- 260—343.6

DONALD G. DAUS, Primary Examiner

A. M. T. TIGHE, Assistant Examiner